(12) United States Patent
Simanovich et al.

(10) Patent No.: US 11,669,351 B2
(45) Date of Patent: Jun. 6, 2023

(54) INTELLIGENT ASSISTANT FOR USER-INTERFACE TO PROVIDE GEOGRAPHIC EVENT INFORMATION BASED ON A SCORE WHICH DEPENDS ON TEXT OF CONVERSATION

(71) Applicant: THE TRAVELERS INDEMNITY COMPANY, Hartford, CT (US)

(72) Inventors: Boris Simanovich, West Hartford, CT (US); Michelle M. Buxton, Colchester, CT (US); Hoa Ton-That, Glastonbury, CT (US); Anastasia Shekhter, South Windsor, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 1309 days.

(21) Appl. No.: 16/017,176

(22) Filed: Jun. 25, 2018

(65) Prior Publication Data
US 2019/0391827 A1  Dec. 26, 2019

(51) Int. Cl.
*G06F 9/451* (2018.01)
*H04M 3/527* (2006.01)
*G06Q 40/08* (2012.01)
*G06F 40/279* (2020.01)
*G06Q 30/016* (2023.01)
*G06N 5/025* (2023.01)

(52) U.S. Cl.
CPC ............ *G06F 9/453* (2018.02); *G06F 40/279* (2020.01); *G06Q 30/016* (2013.01); *G06N 5/025* (2013.01)

(58) Field of Classification Search
CPC .......... G06F 9/453; H04M 3/527; G06Q 40/08
See application file for complete search history.

(56) References Cited

U.S. PATENT DOCUMENTS

| | | | |
|---|---|---|---|
| 10,387,963 B1* | 8/2019 | Leise | H04M 3/527 |
| 11,017,475 B1* | 5/2021 | Dunham | G06Q 40/08 |

\* cited by examiner

*Primary Examiner* — Farzad Kazeminezhad
(74) *Attorney, Agent, or Firm* — MH2 Technology Law Group, LLP

(57) ABSTRACT

Artificial intelligence systems and methods providing enhanced prediction of information relevant to a conversation are disclosed. The method includes monitoring a conversation between a requestor and a provider. The method also includes determining metadata and text of the conversation. The method further includes determining a regional status of the requestor based on the metadata and text of the conversation, regional information, and regional classification rules. Additionally, the method includes determining a local status of the requestor based on the text of the conversation, the regional status, local information, and local classification rules. Moreover, the method includes determining suggestions based on the regional status, the local status, transactional status information, and transactional classification rules. Further, the method includes providing the suggestions to a user-interface device of the provider.

20 Claims, 11 Drawing Sheets

FIG. 11 — 1100

| LOCATIONS | REGION ID | EVENT 1 EARTHQUAKE | EVENT 2 FIRE | EVENT 3 FLOOD | EVENT 4 CRIME |
|---|---|---|---|---|---|
| LOCATION 1 | | [TIME] | | | |
| LOCATION 2 | | [TIME] | [TIME] | | |
| LOCATION 3 | | | | | |
| LOCATION 4 | | | [TIME] | [TIME] | |
| LOCATION 5 | | | | | |
| LOCATION 6 | | | | | |
| LOCATION 7 | | | | | |

| INDIVIDUAL ID | ITEM 1 ACCOUNT 1 | ITEM 2 ACCOUNT 2 | ITEM 3 ID CARD | ITEM 4 HISTORY EVENT |
|---|---|---|---|---|
| INDIVIDUAL 1 | | | | |
| INDIVIDUAL 2 | | | | |
| INDIVIDUAL 3 | | | | |
| INDIVIDUAL 4 | | | | |
| INDIVIDUAL 5 | | | | |
| INDIVIDUAL 6 | | | | |
| INDIVIDUAL 7 | | | | |

FIG. 13 — 1300

| TRANSACTION TYPE | SUGGESTION 1 | SUGGESTION 2 | SUGGESTION 3 | SUGGESTION 4 | SUGGESTION 5 |
|---|---|---|---|---|---|
| HOME DAMAGE/LOSS | | | | | |
| PROPERTY DAMAGE/LOSS | | | | | |
| PERSONAL INJURY | | | | | |
| | | | | | |
| | | | | | |
| | | | | | |

INTELLIGENT ASSISTANT FOR USER-INTERFACE TO PROVIDE GEOGRAPHIC EVENT INFORMATION BASED ON A SCORE WHICH DEPENDS ON TEXT OF CONVERSATION

BACKGROUND

Intelligent assistants are computer programs that perform tasks for individuals. Some intelligent assistants may use natural language processing (NLP) and artificial intelligence (AI) to continuously monitor an individual's spoken or written communications and autonomously interact. For example, an intelligent assistant may be a so-called "chatbot" that detects particular words or phrases in a conversation and automatically performs tasks, such as providing information (e.g., weather and news), controlling devices (e.g., smart appliances), and obtaining services (e.g., purchase items from an online marketplace).

SUMMARY

The present disclosure is directed to an information system providing enhanced prediction of information relevant to a conversation between a requestor and a provider based on multiple levels of context. The information system can include a regional database storing regional information describing physical events within a plurality of geographic regions. The information system can also include a local database storing local information describing a current state of the requestor in relation to the provider. The information system can further include a transaction database storing transactional status information describing transaction types provided by the provider and user-interface suggestions corresponding to the transaction types. Additionally, the information system can include a conversational intelligence module operatively connected to a communication channel between the requestor and the provider. The conversational intelligence module can be configured to monitor the conversation between the requestor and the provider, to determine metadata of the conversation, and to determine text of the conversation. Moreover, the information system can include a regional intelligence module operatively connected to the conversational intelligence module. The regional intelligence module can be configured to determine a regional status of the requestor based the metadata of the conversation, the text of the conversation, the regional information, and regional classification rules. Further, the information system can include a local intelligence module operatively connected to the conversational intelligence module and the regional intelligence module. The local intelligence module can be configured to determine a local status of the requestor based on the text of the conversation, the regional status, the local information, and local classification rules. Still further, the information system can include a transactional intelligence module operatively connected to the conversational intelligence module, the regional intelligence module, and the local intelligence module. The transactional intelligence module can be configured to determine suggestions for the provider based on the regional status, the local status, the transactional status information, and transactional classification rules, and to provide the suggestions to a user-interface device of the provider.

The present disclosure is also directed to a method of providing enhanced prediction of information relevant to a conversation between a requestor and a provider based on multiple levels of context. The method includes monitoring a conversation between a requestor and a provider. The method also includes determining metadata and text of the conversation. The method further includes determining a regional status of the requestor based on the metadata and text of the conversation, regional information, and regional classification rules. The regional information can describe physical events within different geographic regions. Additionally, the method includes determining a local status of the requestor based on the text of the conversation, the regional status, local information, and local classification rules. The local information cab describe a current state of the requestor in relation to the provider. Moreover, the method includes determining suggestions based on the regional status, the local status, transactional status information, and transactional classification rules. The transactional status information can describe transaction types provided by the provider and user-interface suggestions corresponding to the transaction types. Further, the method includes providing the suggestions to a user-interface device of the provider.

DRAWINGS

The present invention will become more fully understood from the detailed description and the accompanying drawings, wherein:

FIG. 11 shows a table illustrating an example of a data structure containing baseline information in accordance with aspects of the present disclosure.

FIG. 12 shows a table illustrating an example of a data structure containing baseline information in accordance with aspects of the present disclosure.

FIG. 13 shows a table illustrating an example of a data structure containing information for dynamically generating queries in accordance with aspects of the present disclosure.

DETAILED DESCRIPTION

The present disclosure is generally directed to systems and processes that provide automated assistants. More particularly, the present disclosure is directed to systems and processes providing an intelligent assistant that monitors communications between a requestor and a provider and that automatically provides relevant information about the requestor to a user-interface. The intelligent assistant can automatically monitor a conversation, determine statuses of the requestor in different contexts using hierarchical tiers of artificial intelligence, and provide suggestions to the provider for interacting with the requester though a user-interface based on a combination of the different statuses. For example, by monitoring a conversation between a customer (e.g., a requestor) and a service provider (e.g., a user), an implementation of the disclosed intelligent assistance can automatically determine information and software applications related to the requestor's current situation and provide such information and software applications to the service provider.

Implementations in accordance with the present disclosure improve upon the technology of intelligent automated assistants by determining the information and applications based on a status of the requestor in different, hierarchical contexts (e.g., regional, local, transactional, prioritization). For example, a regional status can inform a local status, and the regional and local statuses can inform a transactional status. Further, the regional, local, and transactional statuses can inform a prioritization, given the information and applications. By doing so, implementations in accordance with the present disclosure can provide results (e.g., information, suggestions, and applications) better related to the requestor's overall situation. Additionally, by automatically generating suggestions, the intelligent assistant increases the speed at which information can be made available to the provider, while reducing the workload of the provider that might otherwise be involved in identifying and requesting such information. Further, by automatically generating the suggestions, the intelligent assistant can allow providers, such as customer service representatives, to assist customers (e.g., requestors) in areas that fall outside the providers' area of expertise or training.

Reference will now be made in detail to specific implementations illustrated in the accompanying drawings and figures. In the following description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

Figure 1:
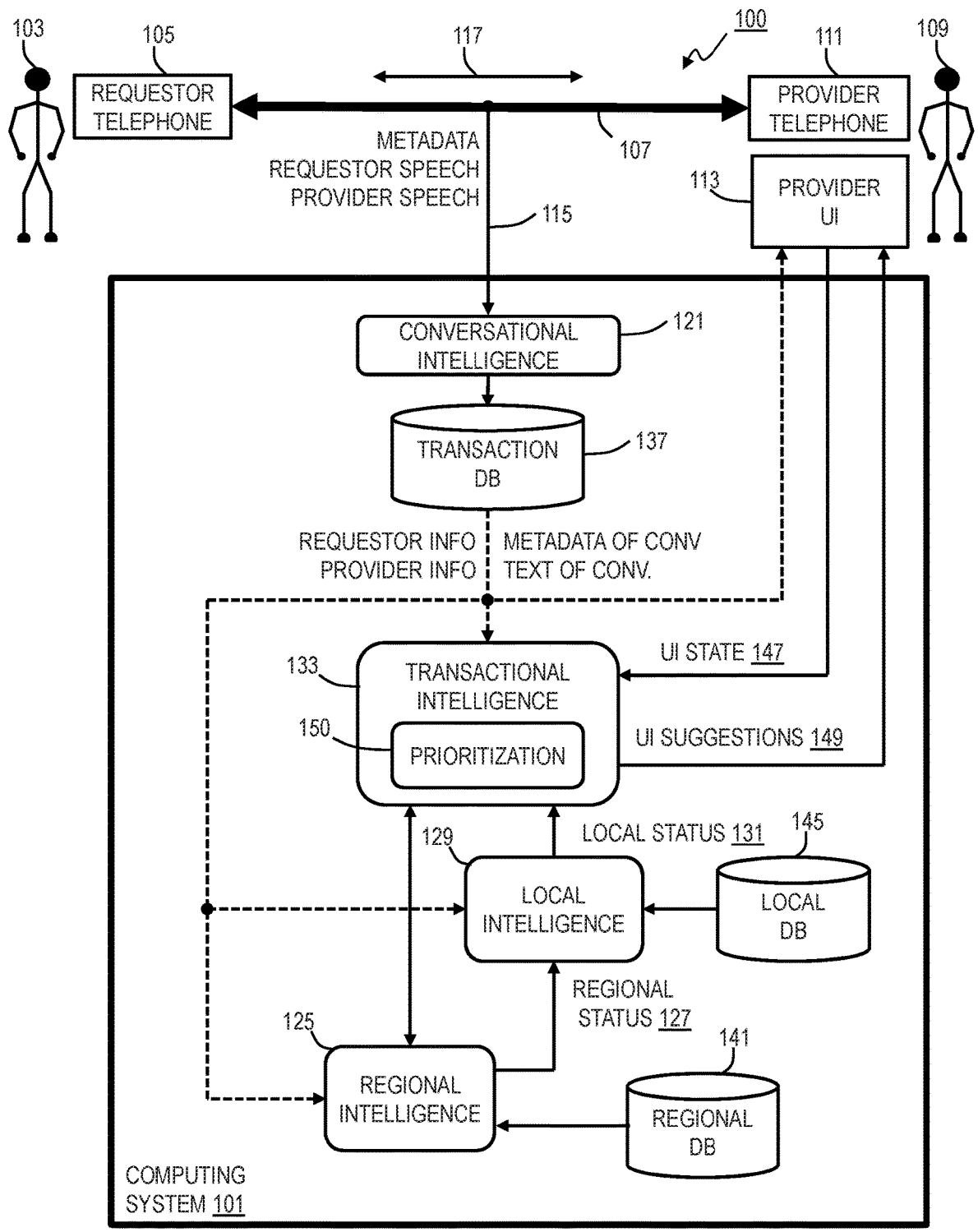
FIG. 1 shows a system block diagram illustrating an example of an environment for implementing systems and processes in accordance with aspects of the present disclosure.

FIG. 1 shows a block diagram illustrating an example of an environment 100 for implementing systems and processes in accordance with aspects of the present disclosure. The environment 100 can include a computing system 101, a requestor 103, a requestor telephone device 105, a communication channel 107, a provider 109, a provider telephone device 111, a provider user-interface device 113, and a communication link 115. The requestor 103 and the provider 109 can be individuals engaged in a two-way conversation 117 over the communication channel 107 using the requestor telephone device 105 and the provider telephone device 111. The provider 109 can be an individual that provides information to the requestor 103 from the computing system 101. In implementations, the provider 109 is a representative (e.g., a customer service representative) of an entity that provides goods, services, or information to the requestor 103. The requestor 103 can be an individual (e.g., a customer) that uses the requestor telephone 105 to communicate with the provider 109. The conversation 117 can be a spoken conversation (e.g., a telephone conversation) or it may be written (e.g., a text conversation using a messaging application).

The telephone devices 105 and 111 allow the requestor 103 and the provider 109 to communicate using the communication channel 107. For example, the telephone devices 105 and 111 can be telephones, mobile phones, smart phones, voice-over-Internet-protocol (VOIP) devices, or personal computers. The provider user-interface device 113 can include any device that enables the provider 109 to interact with the computing system 101. In some implementations, the provider user-interface device 113 may be an input/output device of the computing system 101 (e.g., a touchscreen display, pointer device, keyboard, etc.). In some implementations, the provider user-interface device 113 may be an input/output device of the provider telephone 111. The communication link 115 can comprise wired and/or wireless mediums communicatively linking the computing system 101 to the communication channel 107 and/or the provider telephone 111 and configured to monitor the conversation 117 between the requestor 103 and the provider 109 over the telecommunications channel 107.

The computing system 101 can be operatively and communicatively connected to the provider user-interface device 113. The computing system 101 can include a conversational intelligence module 121, a regional intelligence module 125, a local intelligence module 129, and a transactional intelligence module 133. Additionally, the computing system 101 can include a transaction database 137, a regional database 141, and a local database 145.

The conversational intelligence module 121 can comprise software, hardware, or a combination of hardware and software that is operatively and communicatively connected to the communication channel 107, the regional intelligence module 125, the local intelligence module 129, and the transactional intelligence module 133. The conversational intelligence module 121 can monitor the conversation 117 between the requestor 103 and the provider 109 in the communication channel 107 to obtain metadata of the conversation 117 and text of the conversation 117. The monitoring can be performed continuously. In some implementations, the monitoring and obtaining can be performed at a real-time rate or at a substantially real-time rate.

The metadata of the conversation 117 can be information provided by a provider or operator of the communication channel 107 (e.g., caller ID information) or part of the communication protocol used by the communication channel 107 (e.g., packet headers and link metadata). The metadata can include, for example, an identifier of the requestor 103 (e.g., a name), an identifier of the requestor telephone 105 (e.g., a telephone number, a serial number, or an International Mobile Equipment Identity (IMEI)), and/or location information of the requestor telephone 105 (e.g., geospatial data).

The conversational intelligence module 121 can perform functions including voice recognition, language translation, text-to-speech conversion, natural language processing, and text classification (e.g., tagging) to generate text representing the conversation. Additionally, based on information in the metadata and the text of the conversation 117, the conversational intelligence module 121 can determine an identity of the requestor 103. In some implementations, the conversational intelligence module 121 can store the metadata, the text, and the identity information in the transaction database 137, from which the other modules of the computing system 101 can obtain it. Additionally, in some implementations, the conversational intelligence module 121 can provide the metadata of the conversation and the text of the conversation directly to the regional intelligence module 125, the local intelligence module 129, and the transactional intelligence module 133 in real-time or in near real-time, without having to retrieve that information from the transaction database 137.

The regional intelligence module 125, the local intelligence module 129, and the transactional intelligence module 133 can comprise software, hardware, or a combination of hardware and software that determine information about the requestor 103 in different, hierarchical contexts and progressively combine such information. The regional intelligence module 125 can be functionally and operatively connected to the conversational intelligence module 121, the transaction database 137, the local intelligence module 129, the transactional intelligence module 133, and the regional database 141. In implementations, the regional intelligence module 125 can determine a regional status 127 of the requestor 103 based on the metadata and the text of the conversation 117, and regional information stored in the regional database 141. The regional information can describe current and recent states of a number of locations within a region. For example, the regional information can associate different locations (e.g., zones) of a region (e.g., a county, a state, or larger geographic area), current and recent weather events (e.g., hurricane, flood, tornado, mudslide, hail, extreme blizzard, heat, and the like), emergency events (e.g., earthquake, fire, large accidents, and the like), and crime events (e.g., rioting, burglary, vandalism, automobile theft, automobile break-in, mugging, and the like). Based on information in the metadata and the text of the conversation 117, the regional intelligence module 125 can determine one or more locations of the requestor 103, among other things. Using the information in the regional database 141, the regional intelligence module 125 can determine whether any regional events are occurring or have recently occurred (e.g., within 24 hours, 72 hours, or 120 hours) at the locations of the requestor 103. And, for such recent events, the regional intelligence module 125 can use terms captured from the conversation 117 indicative of the requestor's 103 current state (e.g., home, ambulance, hospital, garage, service center, flood, hurricane, earthquake, tornado, water, hail, fire, break-in, car accident) to determine a regional status 127 of the requestor 103. The regional status 127 can include confidence scores for one or more events determined to have recently occurred within locations of the requestor 103. The regional intelligence module 125 can provide the regional status 127 to the local intelligence module 129 and the transactional intelligence module 133, which can use such information to provide regional context to their respective outputs.

The local intelligence module 129 can be functionally and operatively connected to the conversational intelligence module 121, the transaction database 137, the regional intelligence module 125, the transactional intelligence module 133, and the local database 145. In implementations, the local intelligence module 129 can determine a local status 131 of the requestor 103 based on the metadata of the conversation 117, the text of the conversation 117, local information stored in the local database 145, and the regional status 127 obtained from the regional intelligence module 125. The local database 145 can store information describing a current state of the requestor 103 in relation to the provider 109. For example, the state of requestor 103 can be customer tracking information, including account information, account terms, account notes, history, payments, purchases, sales, cancellations, notes, history, recent interactions, shipments, and the like. Using text of the conversation 117, the local intelligence module 129 can determine the relevance of the local information to the current state of the requestor 103. For example, the local intelligence module 129 can determine a local status 131 identifying any accounts, information, and applications of the requestor 103 or of the provider 109 that are relevant to the regional status 127. The local status 131 can include confidence scores for the accounts, the information, and the applications. For example, if the regional status 127 indicates a high probability of a hurricane event and a flooding event, the local intelligence module may identify that the local database 145 stores account information for homeowners insurance and flood insurance, and assign higher confidence score to these accounts in the local status 131 in comparison to other accounts of the requestor 103 with the provider (e.g., a personal injury account).

The transactional intelligence module 133 can be functionally and operatively connected to the conversational intelligence module 121, the transaction database 137, the regional intelligence module 125, and the local intelligence module 129. Additionally, the transactional intelligence module 133 can be operatively and functionally connected to the provider user-interface device 113, from which the transactional intelligence module 133 can obtain user-interface state information 147 of the provider user-interface device 113, including objects and applications currently being used by the provider 109 and inputs to the provider user-interface 113 (keyboard, mouse, and touchscreen inputs) from the provider 109. In implementations, the transactional intelligence module 133 can determine user-interface suggestions 149 for the provider user-interface 113 based on the metadata and the text of the conversation, the regional status 127 of the requestor 103, the local status 131 of the requestor 103, and the user-interface state information 147. For example, using the foregoing information, the transactional intelligence module 133 can determine user-interface suggestions 149 for information (e.g., questions) the provider 109 may wish to use when interacting with the requestor 103. Additionally, the transactional intelligence module 133 can determine the suggestions 149 for software applications (e.g., service scheduling applications) the provider 109 may use to obtain information and services for the requestor 103. The user-interface suggestions 149 can be associated with respective confidence scores.

Additionally, in implementations, the transactional intelligence module 133 can include a prioritization module 150 that prioritizes the user-interface suggestions 149 for the user-interface device 113 based on the confidence scores of the regional status 127, the local status 131, and the user-interface suggestions 149. In implementations, the prioritization module 150 can determine user-interface suggestions 149 for the provider user-interface 113 based on the metadata and the text of the conversation 117, the regional status 127 of the requestor 103, the local status 131 of the requestor 103, and the user-interface state information 147. For example, the prioritization module 150 can determine that the regional status 127 indicates that a fire likely occurred in a region including the requestor's 103 home, that the local status 131 indicates that the requestor 103 has a home insurance policy account that is likely relevant to the regional status 127, and that the provider typed the word "hotel" into the provider user-interface 113. Based on this information, the prioritization module 150 may prioritize the display of user-interface suggestions 149 including a link to the requestor's 103 home insurance policy and a link for a hotel reservation application.

Figure 2:
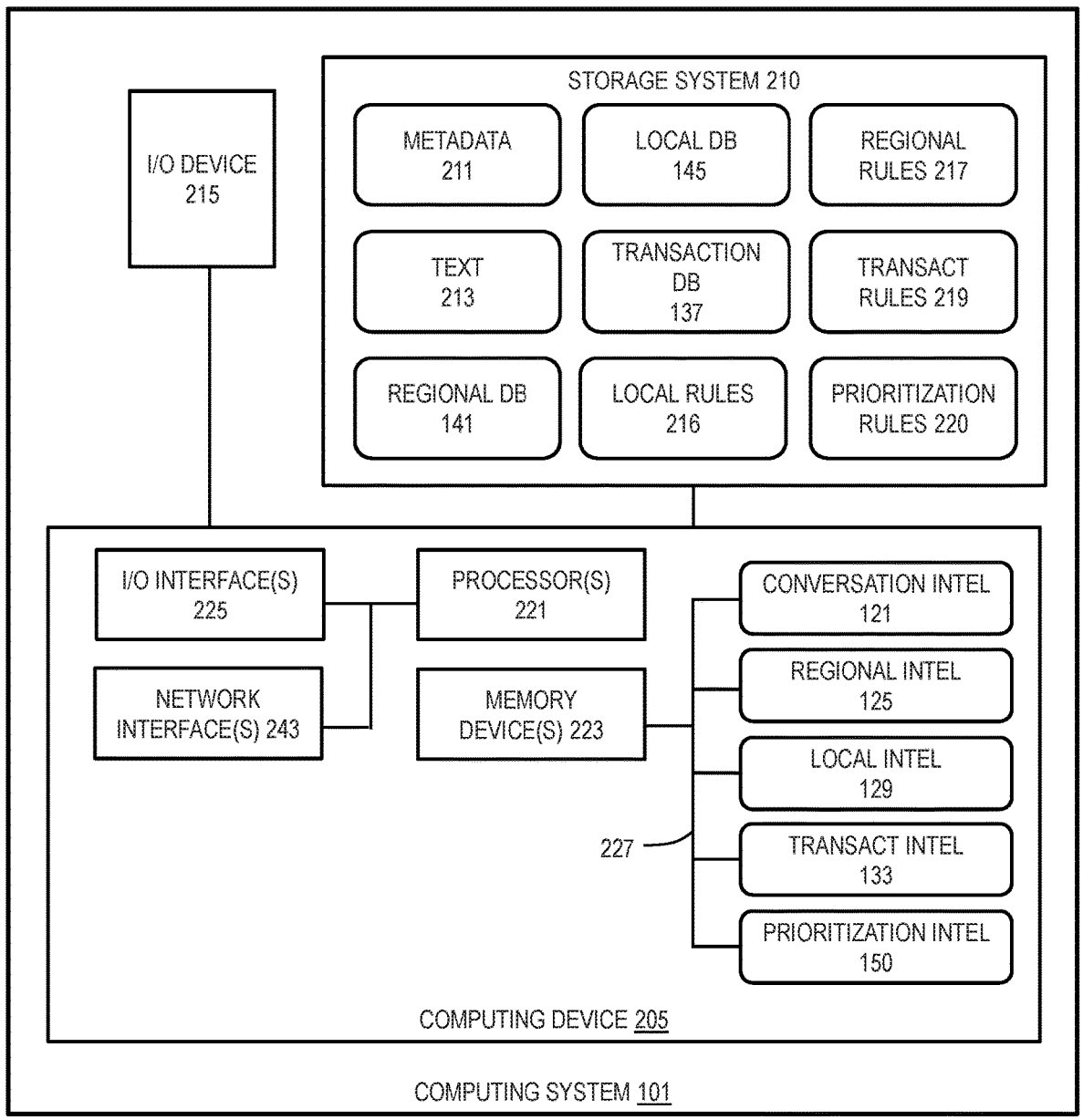
FIG. 2 shows a block diagram illustrating an example of a computing system in accordance with aspects of the present disclosure.

FIG. 2 shows a system block diagram illustrating an example of a computing system 101, in accordance with aspects of the present disclosure. The computing system 101 can be the same or similar to that described above. As depicted in FIG. 2, the computing system 101 includes a computing device 205 and storage system 210, and an input/output (I/O) device 215.

The storage system 210 may comprise a computer-readable, non-volatile hardware storage device that stores information and program instructions. For example, the storage system 210 may comprise one or more flash drives and/or hard disk drives. In accordance with aspects of the present disclosure, the storage system 210 can store metadata 211 (e.g., metadata of conversation 117), text 213 (e.g., text of conversation 117), transaction database 137, regional database 141, local database 145, local rules 216, regional rules 217, transaction rules 219, and prioritization rules 220. The metadata 211, the text 213, the transaction database 137, the regional database 141, and the local database 145 can all be the same or similar to those described previously herein. The local rules 216, the regional rules 217, the transaction rules 219, and the prioritization rules 220 can comprise predefined logic rules for interpreting information in the metadata 211, the text 213, the transaction database 137, the regional database 141, and the local database 145. In some implementations, the local rules 216, the regional rules 217, the transaction rules 219, and the prioritization rules 220 comprise expert-based software configured to deduce a regional status (e.g., regional status 127), a local status (e.g., a local status 131), user-interface suggestions (e.g., user-interface suggestions 149), and prioritizations of the user-interface suggestions 149, as previously described herein. In some implementations, the local rules 216, the regional rules 217, the transaction rules 219, and the prioritization rules 220 comprise artificial intelligence modules having various classifiers. For example, the regional rules 217 can comprise one or more artificial intelligence classifiers that determine whether a conversation relates to a type of location (e.g., home, work, road, hospital, doctor's office, mechanic, and customer service center). The regional rules 217 also can comprise one or more artificial intelligence classifiers that determine whether a conversation relates to a type of regional event (e.g., hurricane, flood, tornado, mudslide, hail, blizzard, extreme heat, earthquake, fire, large accident, rioting, burglary, vandalism, automobile theft, automobile break-in, mugging, and the like). The local rules 216 can provide one or more artificial intelligence classifiers that determine, based on a regional status (e.g., regional status 127) determined by the regional intelligence module 125, whether a conversation relates to a type of item (e.g., automobile, home, flood, personal injury, or account therefor). Additionally, the transaction rules 219 can provide one or more artificial intelligence classifiers that determine, based on the regional status 127 determined by the regional intelligence module 125 and the local status (e.g., local status 131) determined by the local intelligence module, suggestions for a provider (e.g., provider 109) via a provider user-interface (e.g., provider user-interface 113). In some cases, the suggestions can comprise questions or information for the provider 109 to communicate to the requestor 103. Additionally or alternatively, the suggestions can comprise software applications for display to the provider 109 to use when interacting with the requestor 103. Still further, the prioritization rules 220 can provide one or more artificial intelligence classifiers that determine, based on the regional status 127 determined by the regional intelligence module 125, the local status (e.g., local status 131) determined by the local intelligence module 129, and the suggestions 149 determined by the transactional intelligence module 133, an ordered subset of the suggestions for display to a provider via a provider user-interface (e.g., provider user-interface 113).

In embodiments, the computing system 101 includes one or more processors 221 (e.g., microprocessor, microchip, or application-specific integrated circuit), one or more memory devices 223 (e.g., RAM and ROM), one or more I/O interfaces 225, and one or more network interfaces 243. The memory device 223 can include a local memory (e.g., a random-access memory and a cache memory) employed during execution of program instructions. Additionally, the computing system 101 can include one or more one data communication channels 227 (e.g., a data bus) by which it communicates with the I/O device 215 and the storage system 210.

The processor 221 executes computer program instructions (e.g., an operating system and/or application programs), which can be stored in the memory device 223 and/or the storage system 210. The processor 221 can also execute computer program instructions of the conversational intelligence module 121, the regional intelligence module 125, the local intelligence module 129, the transactional intelligence module 133, and the prioritization module 150, which can all be the same or similar to those described previously herein. The computing system 101 is only representative of various possible equivalent computing devices that can perform the processes described herein.

Figure 3:
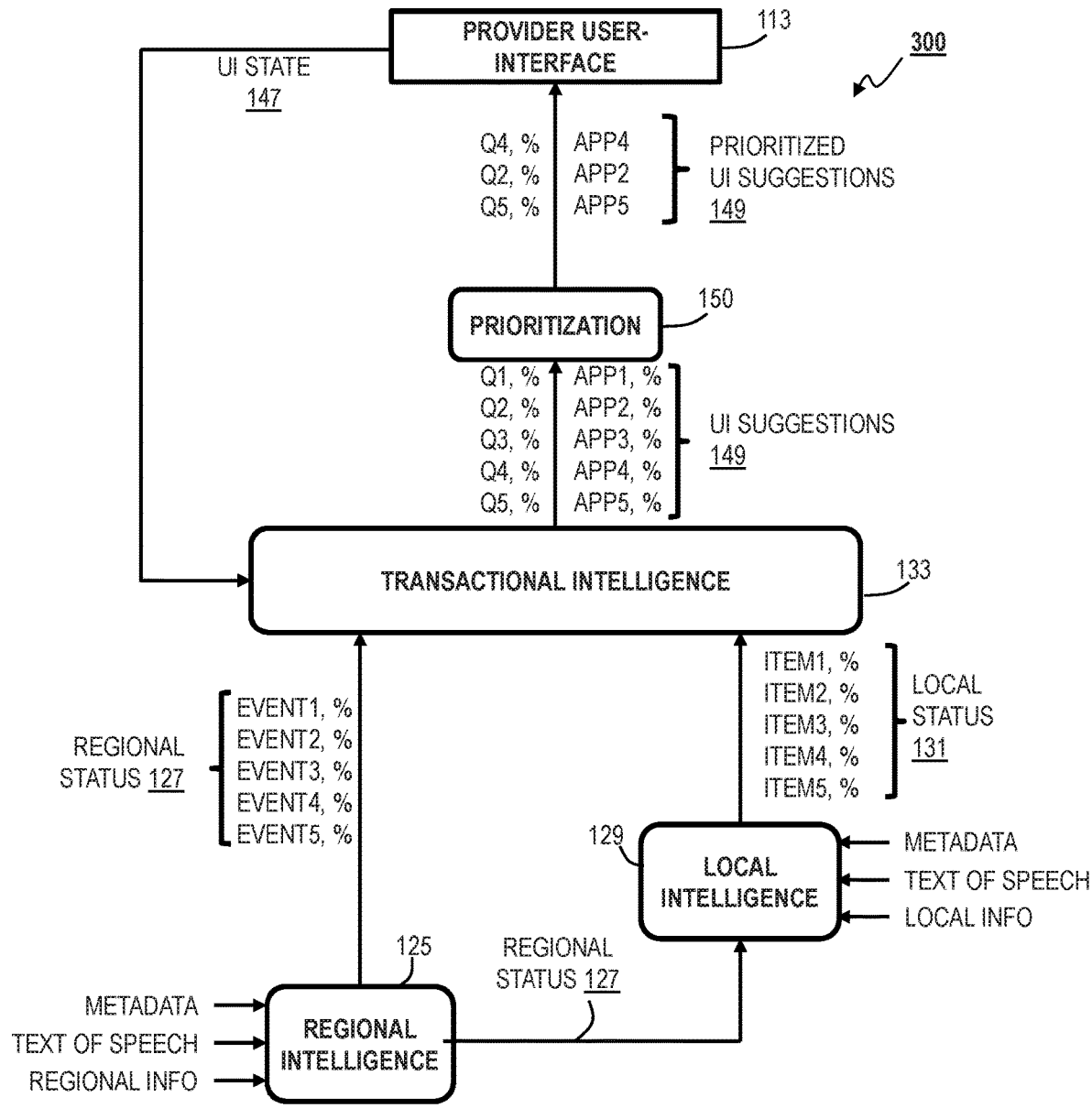
FIG. 3 shows a functional flow block diagram illustrating an example of a process in accordance with aspects of the present disclosure.

FIG. 3 shows a functional flow block diagram illustrating an example of a process 300 performed by a computing system in accordance with aspects of the present disclosure. The computing device can be the same or similar to that previously described herein (e.g., computing system 101) and can include a regional intelligence module 125, a local intelligence module 129, a transactional intelligence module 133, and a prioritization module 150, which can also be the same or similar to those previously described herein. In accordance with the example illustrated in FIG. 3, the computing system can determine and display suggestions 149 for a user (e.g., provider 109) via a user-interface (e.g., provider user-interface 113) based on several hierarchical contexts that determine the state of the requestor (e.g., requestor 103). In the present, non-limiting example, the provider can be a service clerk conversing with a requestor, who may be a customer of the service via telephonic communication (e.g., communication channel 117 between telephones 105 and 111). The regional intelligence module 125 can determine a regional status 127 of the requestor by identifying one or more regional events that may have affected the requestor, and can also determine confidence scores for each of such events. Using expert-based software or artificial intelligence (e.g., regional rules 217), the regional intelligence module 125 can determine a regional status 127 of the requestor based on the metadata and text of a conversation (e.g., conversation 117) and regional information (e.g., information stored in regional database 141). For example, the regional intelligence module 125 can classify the conversation into a number of predefined regional events (Event1 . . . Event5) and determine a confidence score (%) to the events. The metadata can include, for example, an identifier of the requestor, an identifier of the requestor telephone, location information of the requestor telephone, and start time of the conversation. The text of the conversation can include predetermined words and phrases extracted from the conversation (e.g., earthquake, fire, flood, home, work, house, and car). The regional information can include one or more sets of data associating locations with current or recent regional events. Using the metadata, the conversation, keywords extracted from text of the conversation, and the regional information, the regional intelligence module 125 can determine the confidence scores (e.g. probabilities) for the number of events affecting the requestor. For example, based on locations of the requestor, regional information indicating a recent hurricane in those locations, and text including words, such as "water," "flood," "hurricane," and "car," the regional intelligence module 125 may determine a high confidence score for home flooding and/or home water damage, in comparison to low confidence percentages for, e.g., personal medical, home crime, or automobile crime.

The local intelligence module 129 can determine a local status 131 of the requestor by identifying one or more items of local information (e.g., applications, accounts, and information) that may be relevant to the requestor. Using expert-based software or artificial intelligence (e.g., local rules 216), the local intelligence module 129 can determine a local status 131 of the requestor based on the metadata and text of the conversation, local information (e.g., information stored in local database 145), and the regional status 127 determined by the regional intelligence module 125. The local intelligence module 129 can, for example, determine local-area information that may have affected the requestor and which may relate to the purpose of contacting the provider 109. The local information can include a set of data associated with a particular location and/or a particular requestor. Using the metadata, the conversation and keywords extracted from text of the conversation, and regional status 127, the local intelligence module 129 can determine confidence scores that the number of items (e.g., information, accounts) of the requestor related to the requestor's current situation. For example, based on a regional status 127 indicating a high confidence score for home flooding and home water damage, the local intelligence module 129 may determine the local status 131 indicting that the requestor has a flood insurance policy with the provider 109 (e.g., Item1) and assign it a high confidence score (%) in comparison to other policies (e.g., Items2 . . . Item4) of the requestor (e.g. automobile insurance policy).

The transactional intelligence module 133 can determine user-interface suggestions 149 for the provider 109 that identify one or more suggestions (e.g., software applications, information, and questions) relevant to the requestor regional status 127 and local status 131, and can also determine confidence scores for such suggestions. The transactional intelligence module 133 can obtain the regional status 127 from the regional intelligence module 125, and the local status 131 from the local intelligence module 129. Additionally, the transactional intelligence module 133 can obtain user-interface state information 147 (e.g., content and inputs) from the provider user-interface device 113. Using expert-based software or artificial intelligence (e.g., transactional rules 219), the transactional intelligence module 133 can determine one or more user-interface suggestions 149 for display on the provider user-interface 113 and respective confidence scores for the user-interface suggestions 149. For example, based on a regional status 127 indicating a high confidence score for home flooding and home water damage, and further based on the local status 131 that the requestor has a flood insurance policy which has a high confidence score indicating its relevance, the transactional intelligence module 133 can determine one or more user-interface suggestions 149 are highly relevant, along with a confidence score for each suggestion. In this example, the suggestions may include, "Your flood insurance is active and all account balances have been paid." "Would you like to know your flood insurance deductible?" "Would you like me to schedule a water damage assessment?" "Would like me to schedule a water damage mitigation service?" or "Would you like me to arrange a hotel?"

In implementations, the transactional intelligence module 133 includes a prioritization module 150, or is operatively connected to such module, which can be the same or similar to that previously described. The prioritization module prioritizes the user-interface suggestions 149 for the user-interface device 113 based on the confidence scores. For example, if the requestor's flood insurance has expired, then it may be prioritized higher than other suggestions regarding the requestor's flood insurance by the prioritization module 150. Or, for example, if the conversational text indicates that the requestor's house is uninhabitable, then questions related to scheduling a hotel may be prioritized by the rules or intelligence of the prioritization module 150.

Figure 4:
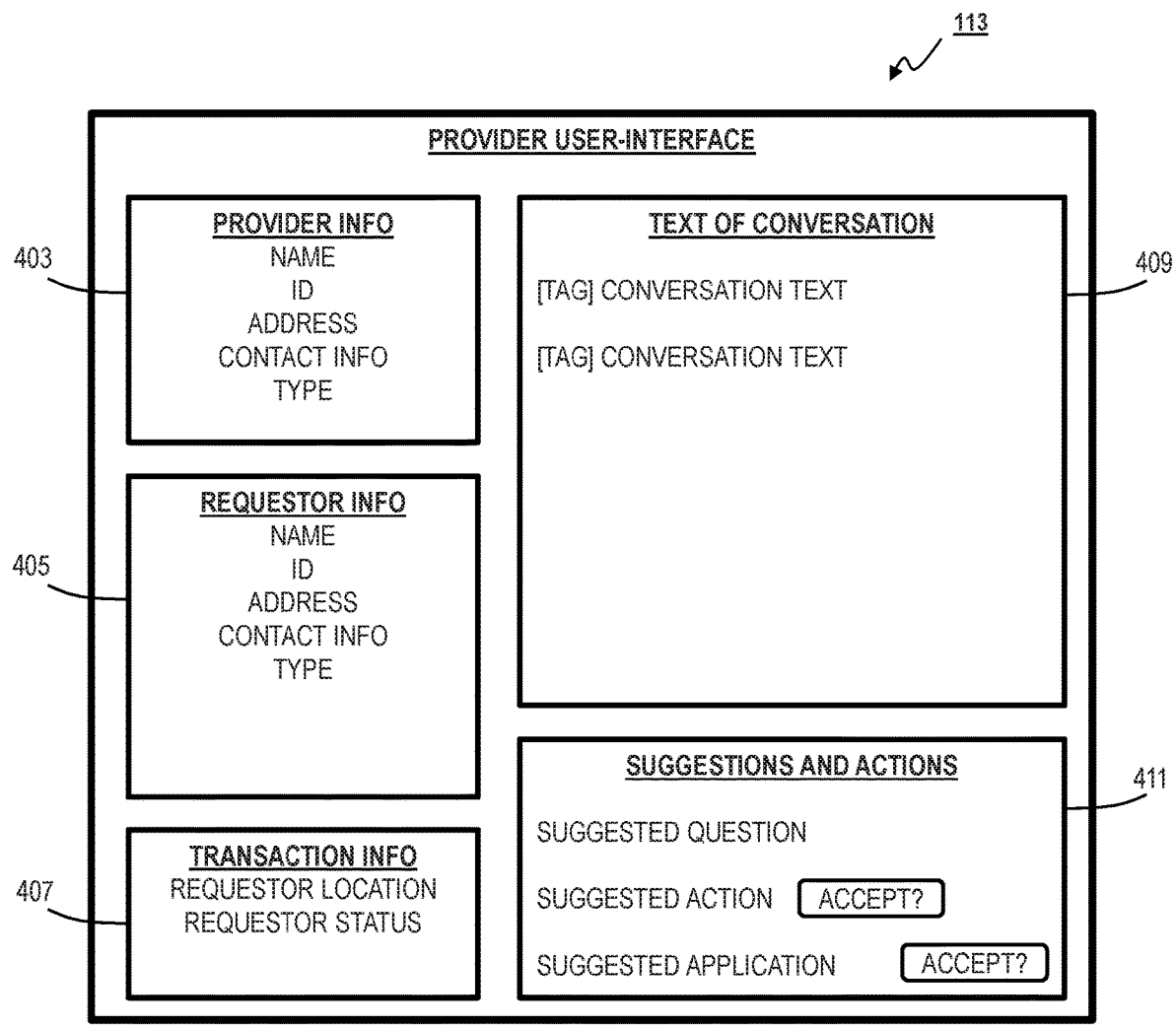
FIG. 4 shows an example of a user-interface in accordance with aspects of the present disclosure.
Figure 5:
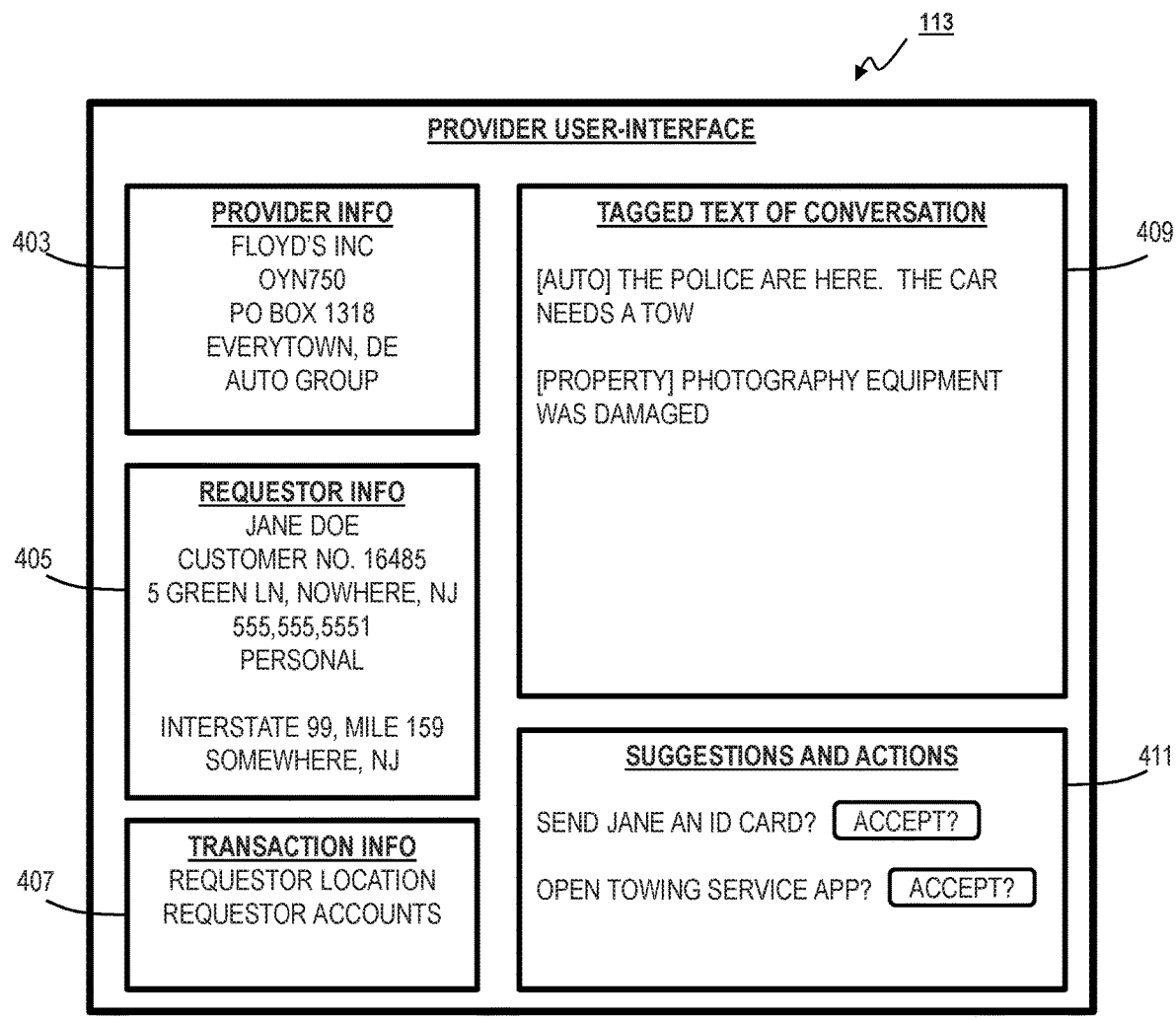
FIG. 5 shows an example of a user-interface in accordance with aspects of the present disclosure.

FIGS. 4 and 5 show examples of a provider user-interface device 113 in accordance with aspects of the present disclosure. The provider user-interface 113 can include a number of display regions that display information relevant to a requestor (e.g., requestor 103) for a provider (e.g., provider 109). The regions can include provider information 403, requestor information 405, transaction information 407, text of conversation 409 between the provider and the requestor and suggestions and actions 411. The provider information 403 and requestor information 405 can include, for example, a name, identifier, address, contact information (e.g., telephone number and email address), and type of entity. The transaction information 407 can include for example, a requestor location and requestor status (determined, e.g., by regional intelligence module 125). The text of the conversation 409 can be text translated from a conversation being monitored (e.g., by conversational intelligence module 121). The suggestions and actions 411 can be, for example, suggested questions, suggested actions, and suggested applications (e.g., user-interface suggestions 149 determined by transactional intelligence module 133) that the provider may wish to use in relation to the requestor. Some of the suggestions can be interactive, such that the provider can manually activate them. For example, one or more of the suggestions displayed may be a hyperlink to information or an application, or may be associated with a selector ("accept") that opens or launches information or an application linked to the suggestion.

The flow diagrams in FIGS. 6-10 illustrate examples of the functionality and operation of possible implementations of systems, methods, and computer program products according to various implementations consistent with the present disclosure. Each block in the flow diagram of FIGS. 6-10 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 6-10. For example, two blocks shown in succession can be executed substantially concurrently, or the blocks can sometimes be executed in the reverse order, depending upon the functionality involved. It will also be noted that each block of the flow diagram and combinations of blocks can be implemented by special purpose hardware-based systems that perform the specified functions or acts, or combinations of special purpose hardware and computer instructions.

Figure 6:
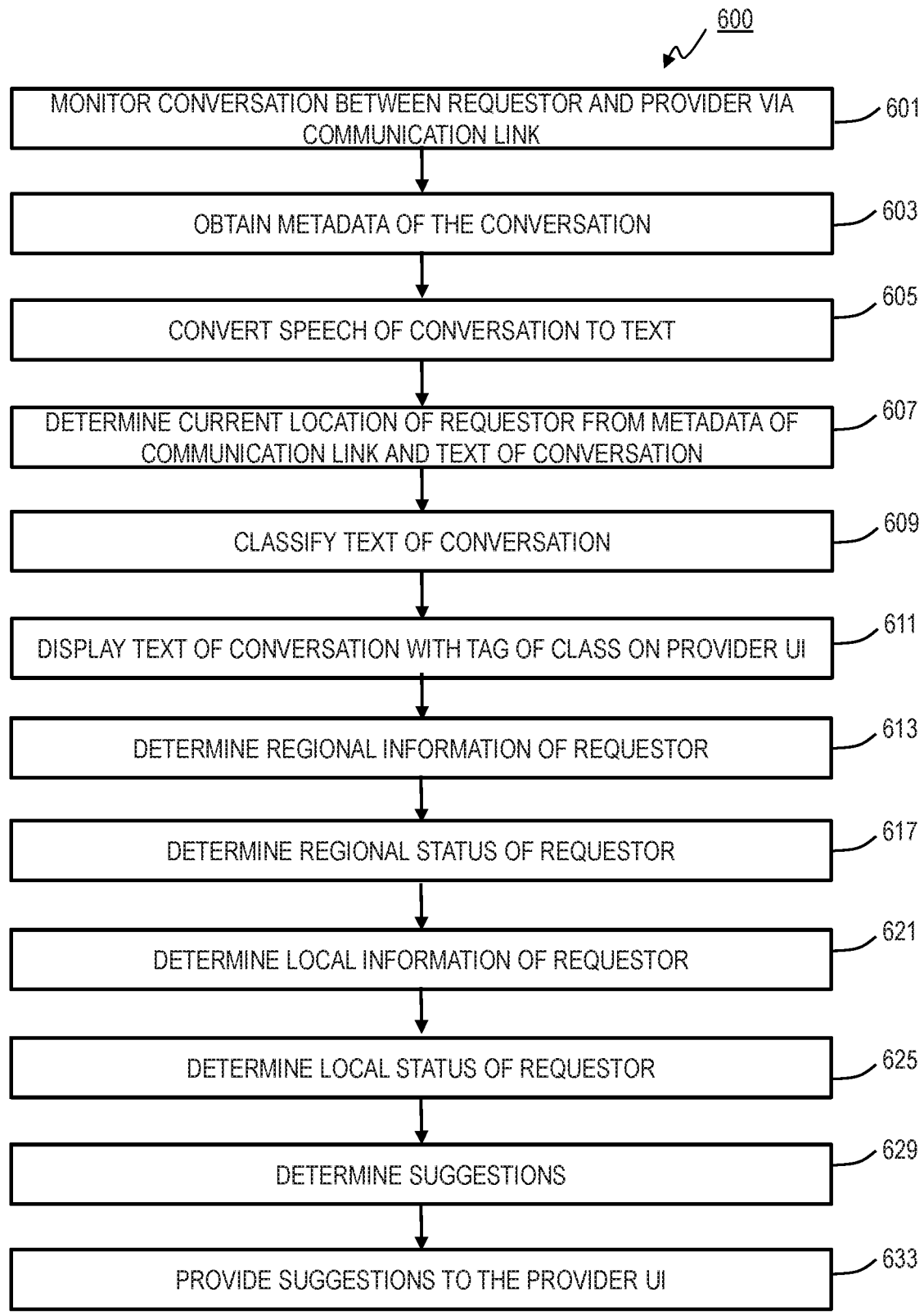
FIG. 6 shows a functional block diagram illustrating an example of a process for automatically providing information for a user by an intelligent assistant in accordance with aspects of the present disclosure.

FIG. 6 shows a functional block diagram illustrating an example of a process 600 for automatically providing information for a user (e.g., provider 109) by an intelligent assistant, in accordance with aspects of the present disclosure. At 601, a computing system (e.g., computing system 101) executing software that provides the intelligent assistant (e.g., conversational intelligence module 121, regional intelligence module 125, local intelligence module 129, transactional intelligence module 133, and prioritization module 150) can monitor a conversation (e.g., conversation 117) between a requestor (e.g., requestor 103) and a provider (e.g., provider 109) via a communication link (e.g., communication link 115). At 603, the computing system can obtain metadata of the conversation monitored at 601. For example, the computing system can obtain an identifier of the requestor, an identifier of the requestor telephone, location information of the requestor telephone, and call start time of the conversation. At 605, the computing system can convert speech of the conversation monitored at 601 to text. For example, the computing system may perform voice recognition, language translation, text-to-speech conversion, and natural language processing to generate text representing the conversation. At 607, the computing system can determine a current location of the requestor based on the metadata obtained at 603 and the speech converted at 605. For example, using location information received in the metadata (e.g., geospatial information and caller ID) and terminology extracted from the conversations (e.g., "mechanic," "hospital," "home," "work," etc.), the computing system can identify the location (e.g., locality, street address, and postal code) of the requestor using mapping software (e.g., a geolocation application program interface).

At 609, the computing system can classify the text of the conversation converted at 605. For example, the computing system (e.g., executing conversational intelligence module 121) can tag the text with one or more of several predefined categories (e.g., automobile, property, home, and personal injury). At 611, the computing system can display the text of the conversation with the classification determined at 609 on a user-interface (e.g., region 409 of provider user-interface 113).

At 613, the computing system can determine regional information of the requestor. For example, based on the locations determined at 607 and a database of regional information (e.g., regional database 141), the computing system (e.g., executing regional intelligence module 125) can determine regional information (e.g., weather, emergencies, crimes) at locations of the requestor. At 617, the computing system can determine (e.g., executing regional intelligence module 125) a regional status (e.g., regional status 127) of the requestor using the regional information determined at 613, the current location of the requestor determined at 607, and the text of the conversation converted at 605. The computing system can determine the regional status by applying predefined rules (e.g., an expert-based software or artificial intelligence software) to the various data to classify the conversation into the predetermined events, and to provide such events confidence scores, as previously described herein.

At 621, the computing system can determine local information of the requestor. For example, based on the metadata obtained at 603 (e.g., requestor name, telephone number, email address, etc.), the computing system can determine information about requestor with regard to the provider (e.g., account information, account terms, account notes, history, payments, purchases, sales, cancellations, notes, history, recent interactions, shipments, etc.) At 625, the computing system can determine local status of the requestor using the regional information determined at 613, the current location of the requestor determined at 607, and the text of the conversation determined at 605. The computing system can determine the local status by applying predefined rules (e.g., an expert-based software or artificial intelligence software) to the various data to determine the relevance of predetermined types of local information (e.g., account types and request types) to the conversation events, and to provide confidence scores to such types, as previously described herein.

At 629, the computing system can determine suggestions (e.g., user-interface suggestions 149) for the provider based on the local status determined at 625, the regional status determined at 617, the current location determined at 607, and the text of the conversation determined at 605. The computing system can determine the suggestions by applying predefined rules (e.g., an expert-based software or artificial intelligence software) to the various data to classify the conversation into the predetermined questions or suggestions, and to provide the suggestions confidence scores, as previously described herein. The computing system can determine the priorities for the suggestions determined at 629 by applying predefined rules (e.g., an expert-based software or artificial intelligence software) based on the confidence scores of the suggestions. At 633, the computing system can selectively provide some or all of the suggestions determined at 629 to a user-interface of the provider (e.g., provider user-interface device 113) based on the priorities.

Figure 7:
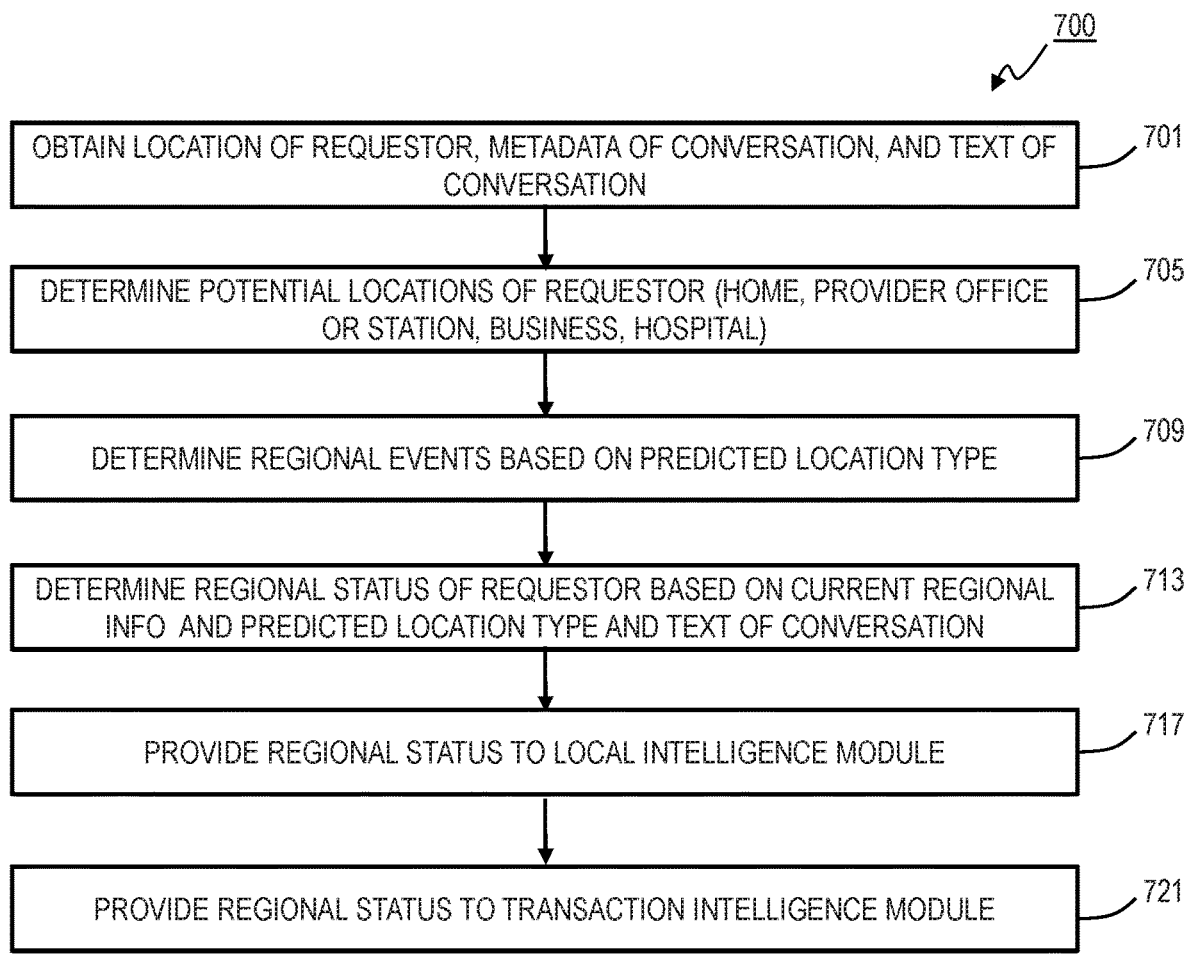
FIG. 7 shows a functional block diagram illustrating an example of a process for determining a regional status in accordance with aspects of the present disclosure.

FIG. 7 shows a functional block diagram illustrating an example of a process 700 for determining a regional status (e.g., regional status 127) in accordance with aspects of the present disclosure. At 701, a computing system (e.g., computing system 101) can obtain the location of a requestor (e.g., requestor 103), metadata of a conversation (e.g., conversation 117), and text of the conversation, as previously described herein. At 705, the computing system can determine potential locations of the requestor. For example, based on location information in the metadata and text of conversation obtained at 701, the computing device may determine addresses that may be recent or current locations of the requestor (e.g., home, provider office or station, business, hospital). At 709, the computing system can determine current regional events based on potential locations of the requestor determined at 705. For example, the current regional events can be obtained by cross referencing the potential locations of the requestor with information stored in a regional database (e.g., regional database 141). At 713, the computing system can determine the regional status of the requester based on current regional information and predicted location type and text of conversation. For example, based on the metadata and the text of the conversation, a confidence score can be assigned to each regional event identified at 709. At 717, the computing system can provide the regional status determined at 713 to a local intelligence module (e.g., local intelligence module 129). Additionally, at 721, the computing system can provide the regional status determined at 713 to a transactional intelligence module (e.g., transactional intelligence module 133).

Figure 8:
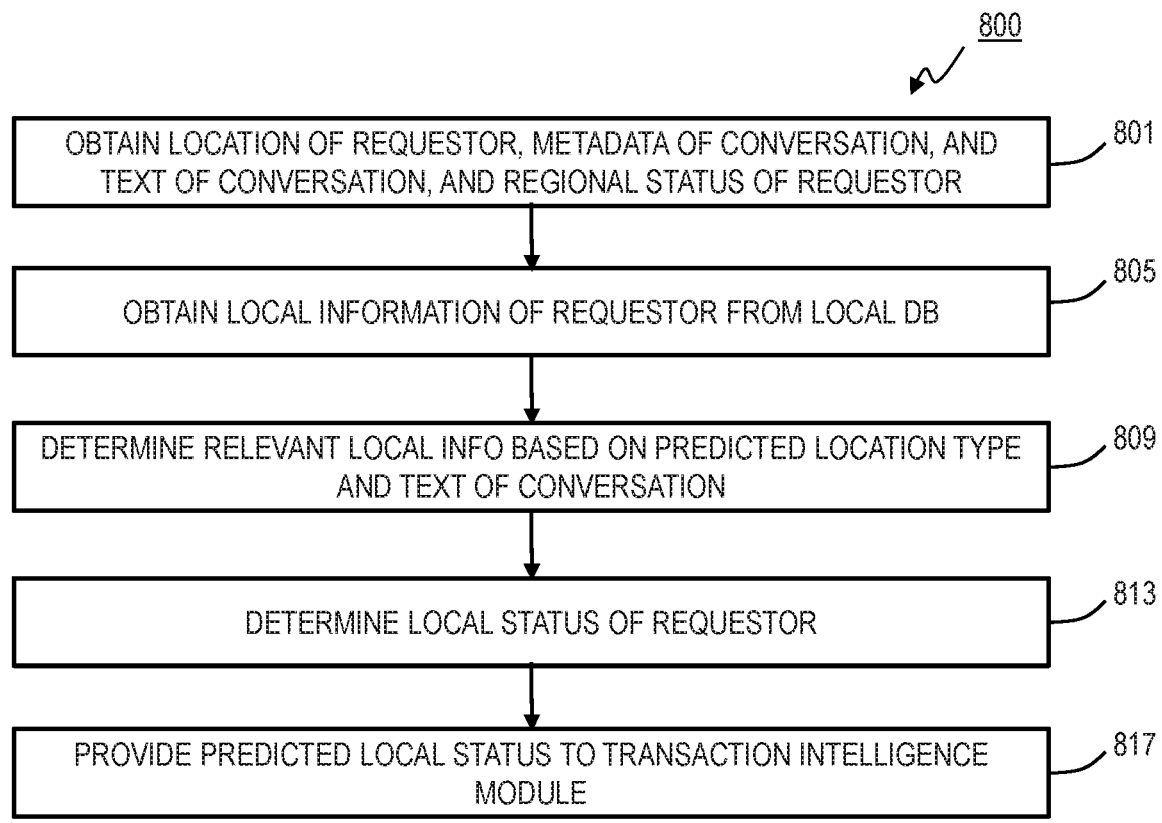
FIG. 8 shows a functional block diagram illustrating an example of a process for determining a local status in accordance with aspects of the present disclosure.

FIG. 8 shows a functional block diagram illustrating an example of a process 800 for determining a local status (e.g., local status 131), in accordance with aspects of the present disclosure. At 801, a computing system (e.g., computing system 101) can obtain the location of the requestor, metadata of a conversation, and text of the conversation, and a regional status of requestor, as previously described herein. At 805, the computing system can obtain local information of the requestor from a local database (e.g., local database 145). For example, based on the identity of the requestor and other information obtained at 801, the computing system can determine accounts maintained by the provider or past interactions the requestor has had with the provider. At 809, the computing system can determine relevant items of local information based on the predicted location type and the text of the conversation obtained at 801. Based on events and confidence scores included in the regional status, metadata and text of the conversation, and the local information obtained at 805, accounts relevant to the regional status can be determined. For example, based on a regional status indicating that flooding recently occurred at a location of the requestor, the computing system can determine that a flood insurance account of the requestor is relevant to the transaction and assign a confidence scored to such determination. At 813, the computing system can determine local status of requester based on local info, regional status, metadata of conversation, and text of conversation. The local status can identify one or more items of local information determined to be relevant along with a confidence score, as previously described herein. At 817, the computing system can provide the predicted local status to a transactional intelligence module (e.g., transactional intelligence module 133).

Figure 9:
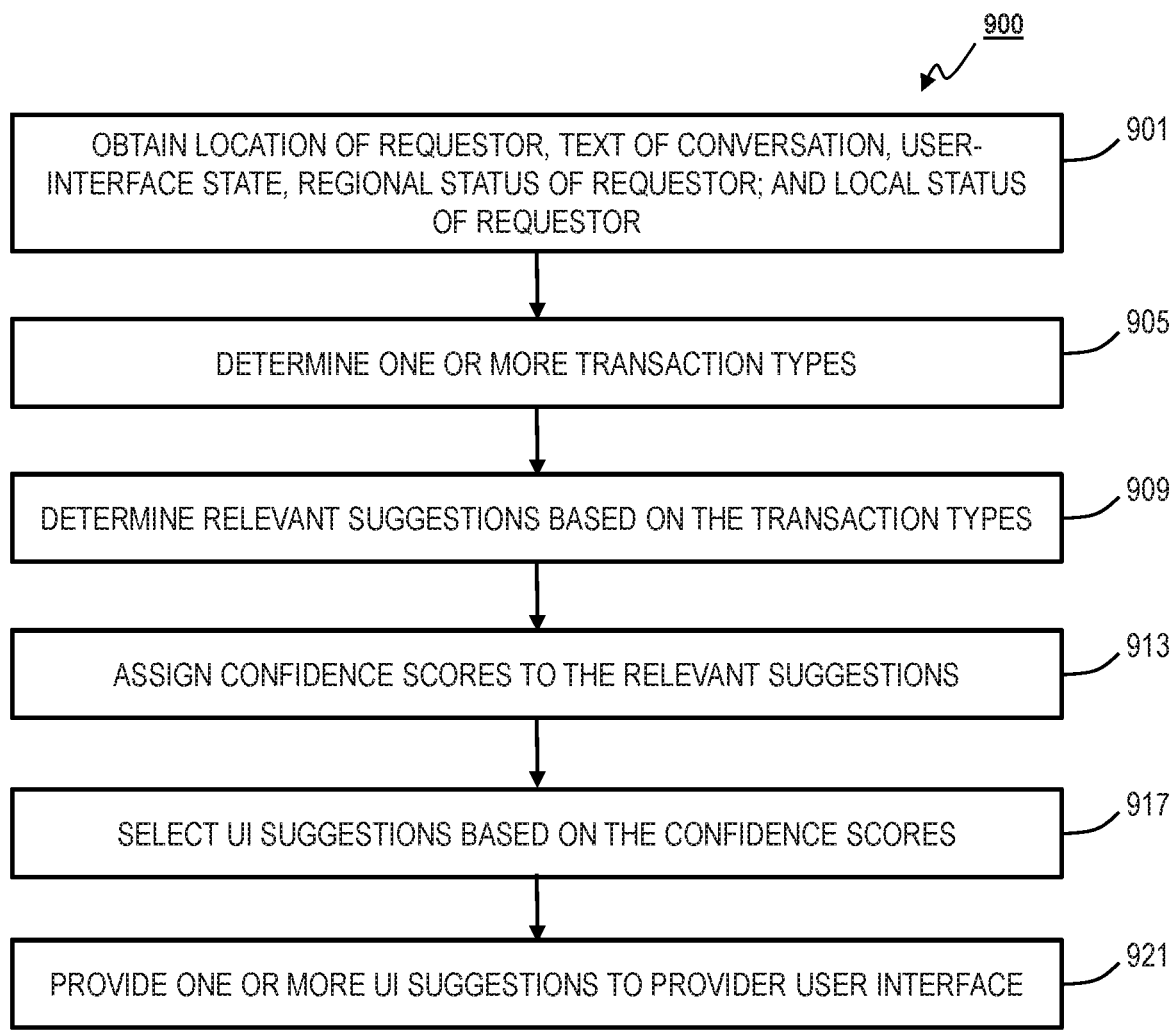
FIG. 9 shows a functional block diagram illustrating an example of a process for determining suggestions in accordance with aspects of the present disclosure.

FIG. 9 shows a functional block diagram illustrating an example of a process 900 for determining suggestions (e.g., user-interface suggestions 149), in accordance with aspects of the present disclosure. At 901, a computing system (e.g., computing system 101) can obtain the location of the requestor, metadata and text of conversation, a state of the user-interface (e.g., inputs and displayed information), a regional status of the requestor (e.g., regional status 127), and a local status of the requestor (e.g. local status 131), as previously described herein. At 905, the computing system can determine one or more transaction types based on the location of the requestor, the metadata and text of the conversation, the regional status of the requestor, and the local status of the requestor obtained at 901. For example, the transaction types may indicate that the conversation is being directed to home damage, automobile damage, property damage, or personal injury. At 909, the computing system can determine relevant suggestions for the provider based on transaction types determined at 905. For example, the suggestions can be obtained by cross referencing the transaction types with predetermined suggestions stored in a transaction database (e.g., transaction database 137). As described previously, the suggestions can include information, questions, or applications.

At 913, the computing system can assign confidence scores to the suggestions determined at 909, as previously described herein. For example, the confidence scores may be assigned based on the location of the requestor, the metadata and text of the conversation, a regional status of the requestor, and a local status of the requestor obtained at 901. If the regional status indicates a high confidence that a flooding event recently or currently affects the requestor's location, the local status indicates a high confidence of the relevance of an active flood insurance policy, and the text of the conversation indicates that the provider mentioned the words "home" and "flood," then user-interface suggestions corresponding to home flooding can be assigned a high confidence score in relation to other regional events and local status types. At 917, the computing system can select suggestions determined at 913 based on the confidence scores. At 921, the computing system can provide one or more suggestions corresponding to selected transactional classification to a provider user-interface (e.g., provider user-interface device 113).

Figure 10:
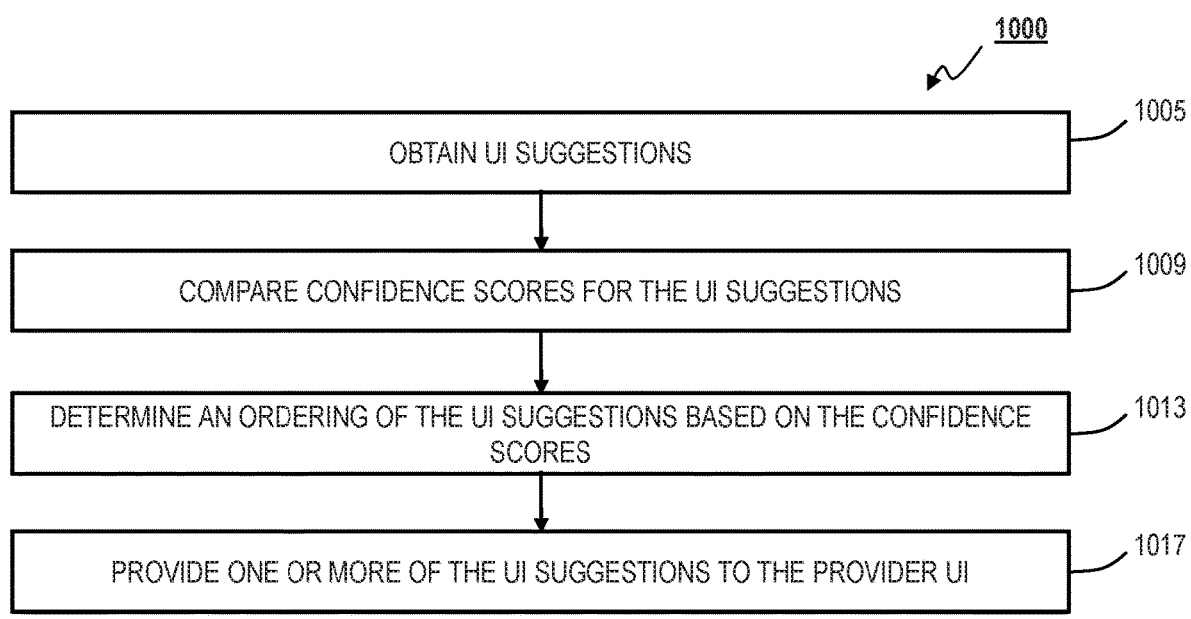
FIG. 10 shows a functional block diagram illustrating an example of a process for prioritizing suggestions in accordance with aspects of the present disclosure.

FIG. 10 shows a functional block diagram illustrating an example of a process 1000 for prioritizing suggestions, in accordance with aspects of the present disclosure. At 1005, a computing system (e.g., computing system 101) can obtain user-interface suggestions (e.g., user-interface suggestions 149), as previously described herein. For example, the suggestions can include information, questions, and software applications that have been determined (e.g., by transactional intelligence module 133) relevant to a conversation (e.g., conversation 117) between a requestor (e.g., requestor 103) and a provider (e.g., provider 109). Additionally, as previously detailed herein, the suggestions may be associated with respective confidence scores indicating probabilities of the potential relevance to the conversation (e.g., as determined by the transactional intelligence module 133). At 1009, the computing system can compare confidence scores for the user-interface suggestions obtained at 1005. At 1013, the computing system can determine an ordering of the user-interface suggestions based on the comparison of the confidence scores at 1009. At 1017, the computing system can selectively determine to provide one or more of the user-interface suggestions to the provider user-interface (e.g., provider user-interface device 113) based on the comparison at 1009 and the ordering determined at 1013. For example, the computing system can determine to display the topmost three suggestions in the determined ordering.

FIG. 11 shows a table 1100 illustrating an example of a data structure containing regional information (e.g., a regional database 141) in accordance with aspects of the present disclosure. The table 1100 cross-references a number of locations 1105 in one or more regions 1109, with different regional events 1113-1125. Particular ones of the events 1113 occurring in the region 1109 may be associated with a time 1129, indicating when the events 1113-1125 or how recently the events 1113-1125 occurred. By referencing the table 1100, implementations consistent with the present disclosure can determine one or more of the events 1113-1125 (e.g., emergency, weather, and crime events) at locations 1105 relevant to a regional status (e.g., regional status 127) in a transaction with a particular requestor (e.g. requestor 103).

FIG. 12 shows a table 1200 illustrating an example of data structure containing local information (e.g., a local database 145) in accordance with aspects of the present disclosure. The table 1200 cross-references a number of individuals 1205 (e.g., requestors) with a number of different items 1213-1225. By referencing the table 1200, implementations consistent with the present disclosure can determine one or more of the items 1213-1225 (e.g., accounts and information) relevant to a local status (e.g. local status 131) in a transaction with a particular requestor (e.g. requestor 103).

FIG. 13 shows a table 1300 illustrating an example of data structure containing user-interface suggestions (e.g., transaction database 137), in accordance with aspects of the present disclosure. The table 1300 cross references a number of transaction types 1305 with corresponding suggestions 1309-1325 (e.g., offers for information, questions, and applications). By referencing the table 1300, implementations consistent with the present disclosure can determine user-interface suggestions (e.g., user-interface suggestions 149) for a transaction with a particular requestor (e.g. requestor 103).

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. An information system providing enhanced prediction of information relevant to a conversation between a requestor and a provider based on multiple levels of context, the information system comprising:
   a regional database storing regional information, wherein the regional information comprises information describing physical events within a plurality of geographic regions independent of the requestor; and
   a local database storing local information, wherein the local information comprises information describing a current state of the requestor in relation to the provider;
   a transaction database storing transactional status information, wherein the transactional status information comprises information describing a plurality of transaction types provided by the provider and a plurality of user-interface suggestions corresponding to the plurality of transaction types;
   a conversational intelligence module operatively connected to a communication channel between the requestor and the provider, and configured to:
      monitor the conversation between the requestor and the provider,
      determine metadata of the conversation, and
      determine text of the conversation;
   a regional intelligence module operatively connected to the conversational intelligence module and configured to determine a regional status of the requestor based on the metadata of the conversation, the text of the conversation, the regional information, and regional classification rules, wherein determining the regional status comprises determining one or more events of the requestor based on the regional information, the text, and a location of the requestor, and wherein determining the regional status further comprises determining confidence scores of the one or more events;
   a local intelligence module operatively connected to the conversational intelligence module and the regional intelligence module, and configured to determine a local status of the requestor based on the text of the conversation, the regional status, the local information, and local classification rules; and
   a transactional intelligence module operatively connected to the conversational intelligence module, the regional intelligence module, and the local intelligence module, and configured to:
      determine one or more suggestions for the provider based on the regional status, the local status, the transactional status information, and transactional classification rules; and
      provide the one or more suggestions to a user-interface device of the provider; and wherein the determining confidence scores of the one or more events includes determining the confidence scores using, at least in part, the text.

2. The information system of claim 1, wherein determining the local status comprises determining one or more items related to the requestor.

3. The information system of claim 2, wherein determining the one or more items related to the requestor comprises determining confidence scores of the one or more items.

4. The information system of claim 1, wherein the regional intelligence module, the local intelligence module, and the transactional intelligence module are configured to determine information using artificial intelligence.

5. The information system of claim 1, wherein the transactional intelligence module is further configured to:
classify segments of the text into a plurality of text types; and
tag the segments of the text using the plurality of text types.

6. The information system of claim 1, further comprising:
a prioritization module configured to prioritize the one or more suggestions based on the regional information and the local information.

7. The information system of claim 1, wherein the one or more events comprises weather events, emergency events, and crime events.

8. The information system of claim 1, wherein:
determining the one or more suggestions comprises:
determining confidence scores of the one or more suggestions, and
determining priorities of the one or more suggestions according to the confidence scores of the one or more suggestions; and
providing the one or more suggestions to the user-interface device comprises displaying the one or more suggestions according to the priorities.

9. A method comprising:
monitoring, by a computing system, a conversation between a requestor and a provider;
determining, by the computing system, metadata of the conversation;
determining, by the computing system, text of the conversation;
determining, by the computing system, a regional status of the requestor based on the metadata of the conversation, the text of the conversation, regional information, and regional classification rules, wherein the regional information comprises information describing physical events within a plurality of geographic regions independent of the requestor, wherein determining the regional status comprises determining one or more events of the requestor based on the regional information, the text, and a location of the requestor, and wherein determining the regional status comprises determining confidence scores of the one or more events;
determining, by the computing system, a local status of the requestor based on the text of the conversation, the regional status, local information, and local classification rules, wherein the local information comprises information describing a current state of the requestor in relation to the provider;
determining, by the computing system, one or more suggestions for the provider based on the regional status, the local status, transactional status information, and transactional classification rules, wherein the transactional status information comprises information describing a plurality of transaction types provided by the provider and a plurality of user-interface suggestions corresponding to the plurality of transaction types; and
providing, by the computing system, the one or more suggestions to a user-interface device of the provider; and
wherein the determining confidence scores of the one or more events includes determining the confidence scores using, at least in part, the text.

10. The method of claim 9, wherein determining the local status comprises determining one or more items related to the requestor.

11. The method of claim 10, wherein determining the one or more items related to the requestor comprises determining confidence scores of the one or more items.

12. The method of claim 9, wherein the regional status, the local status, and the one or more suggestions are determined using respective artificial intelligence classifiers.

13. The method of claim 9, further comprising:
classifying segments of the text into a plurality of text types; and
tagging the segments of the text using the plurality of text types.

14. The method of claim 9, further comprising prioritizing the one or more suggestions based on the regional information and the local information.

15. The method of claim 9, wherein the one or more events comprises weather events, emergency events, and crime events.

16. The method of claim 9, wherein:
determining the one or more suggestions comprises:
determining confidence scores of the one or more suggestions, and determining priorities of the one or more suggestions according to the confidence scores of the one or more suggestions; and
providing the one or more suggestions to the user-interface device comprises displaying the one or more suggestions according to the priorities.

17. A non-transitory computer readable medium storing instructions that when executed by a computing system cause the computing system to perform a method, the method comprising:
monitoring a conversation between a requestor and a provider;
determining metadata of the conversation;
determining text of the conversation;
determining a regional status of the requestor based on the metadata of the conversation, the text of the conversation, regional information, and regional classification rules, wherein the regional information comprises information describing physical events within a plurality of geographic regions independent of the requestor, wherein determining the regional status comprises determining one or more events of the requestor based on the regional information, the text, and a location of the requestor, and wherein determining the regional status comprises determining confidence scores of the one or more events;
determining a local status of the requestor based on the text of the conversation, the regional status, local information, and local classification rules, wherein the local information comprises information describing a current state of the requestor in relation to the provider;
determining one or more suggestions for the provider based on the regional status, the local status, transactional status information, and transactional classification rules, wherein the transactional status information comprises information describing a plurality of transaction types provided by the provider and a plurality of user-interface suggestions corresponding to the plurality of transaction types; and providing the one or more suggestions to a user-interface device of the provider; and wherein the determining confidence scores of the one or more events includes determining the confidence scores using, at least in part, the text.

18. The non-transitory computer-readable medium of claim 17, wherein the regional status, the local status, and the one or more suggestions are determined using respective artificial intelligence classifiers.

19. The non-transitory computer-readable medium of claim 17, wherein the method further comprises:

classifying segments of the text into a plurality of text types; and tagging the segments of the text using the plurality of text types.

20. The non-transitory computer-readable medium of claim 17, wherein the method further comprises prioritizing the one or more suggestions based on the regional information and the local information.

\* \* \* \* \*